(12) United States Patent
Song et al.

(10) Patent No.: US 11,572,319 B2
(45) Date of Patent: Feb. 7, 2023

(54) SOLID WASTE-BASED POROUS MATERIALS, METHODS FOR PREPARING THE SAME, AND METHODS OF ECOLOGICAL RESTORATION OF COAL GANGUE HILLS BY APPLYING THE SAME

(71) Applicant: SHANXI UNIVERSITY, Shanxi (CN)

(72) Inventors: Huiping Song, Taiyuan (CN); Yuanhong Fu, Taiyuan (CN); Fangqin Cheng, Taiyuan (CN); Zhengjun Feng, Taiyuan (CN); Yan Zou, Taiyuan (CN); Yuan Fan, Taiyuan (CN); Tao Zhu, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 17/662,431

(22) Filed: May 8, 2022

(65) Prior Publication Data
US 2022/0267228 A1 Aug. 25, 2022

Related U.S. Application Data

(63) Continuation of application No. PCT/CN2021/134677, filed on Dec. 1, 2021.

(51) Int. Cl.
*C05G 3/80* (2020.01)
*A01G 18/22* (2018.01)
(Continued)

(52) U.S. Cl.
CPC ............ *C05G 3/80* (2020.02); *A01C 21/00* (2013.01); *A01C 23/047* (2013.01); *A01G 18/10* (2018.02);
(Continued)

(58) Field of Classification Search
CPC ...... A01G 18/22; A01G 18/10; A01C 23/047; C04B 18/12; C04B 28/144; C04B 38/02; C04B 2111/00732
See application file for complete search history.

(56) References Cited

FOREIGN PATENT DOCUMENTS

CN 101920261 A 12/2010
CN 102399113 A 4/2012
(Continued)

OTHER PUBLICATIONS

International Search Report in PCT/CN2021/134677 dated Dec. 29, 2021, 9 pages.
(Continued)

*Primary Examiner* — Monica L Perry
*Assistant Examiner* — Aaron M Rodziwicz
(74) *Attorney, Agent, or Firm* — Metis IP LLC

(57) ABSTRACT

The present disclosure relates to the field of ecological restoration of a coal gangue hill, and in particular, to a solid waste-based porous material, a method for preparing the solid waste-based porous material, and a method of ecological restoration of the coal gangue hill by applying the solid waste-based porous material. A coal-based solid waste restoration material and mycorrhizal solid bacterial agent are mixed to restore the coal gangue hill, the coal-based solid waste restoration material is prepared by mixing coal-based solid waste porous materials, low-rank coal, and waste organic matter and adding a microbial quickly decomposition agent for aerobic fermentation and standing.

4 Claims, 1 Drawing Sheet

(51) Int. Cl.

| | |
|---|---|
| *A01G 18/10* | (2018.01) |
| *C05G 5/12* | (2020.01) |
| *A01C 21/00* | (2006.01) |
| *A01C 23/04* | (2006.01) |
| *C04B 18/12* | (2006.01) |
| *C04B 28/14* | (2006.01) |
| *C04B 38/00* | (2006.01) |
| *C04B 38/02* | (2006.01) |
| *C05F 11/08* | (2006.01) |
| *C09K 17/44* | (2006.01) |
| *C04B 111/00* | (2006.01) |

(52) U.S. Cl.
CPC ............ *A01G 18/22* (2018.02); *C04B 18/12* (2013.01); *C04B 28/144* (2013.01); *C04B 38/009* (2013.01); *C04B 38/02* (2013.01); *C05F 11/08* (2013.01); *C05G 5/12* (2020.02); *C09K 17/44* (2013.01); *C04B 2111/00732* (2013.01)

(56) References Cited

FOREIGN PATENT DOCUMENTS

| | | | | |
|---|---|---|---|---|
| CN | 103609303 A | | 3/2014 | |
| CN | 105689375 A | | 6/2016 | |
| CN | 105993259 A | | 10/2016 | |
| CN | 110122204 A | * | 8/2019 | |
| CN | 110402635 A | | 11/2019 | |
| CN | 111117629 A | | 5/2020 | |
| CN | 112705567 A | * | 4/2021 | ............ A01G 18/10 |
| CN | 112897972 A | | 6/2021 | |
| CN | 112934944 A | | 6/2021 | |
| KR | 100974911 B1 | | 8/2010 | |
| KR | 101566359 B1 | | 11/2015 | |

OTHER PUBLICATIONS

Written Opinion in PCT/CN2021/134677 dated Dec. 29, 2021, 10 pages.

First Office Action in Chinese Application No. 202110119396.1 dated Sep. 23, 2021, 16 pages.

* cited by examiner

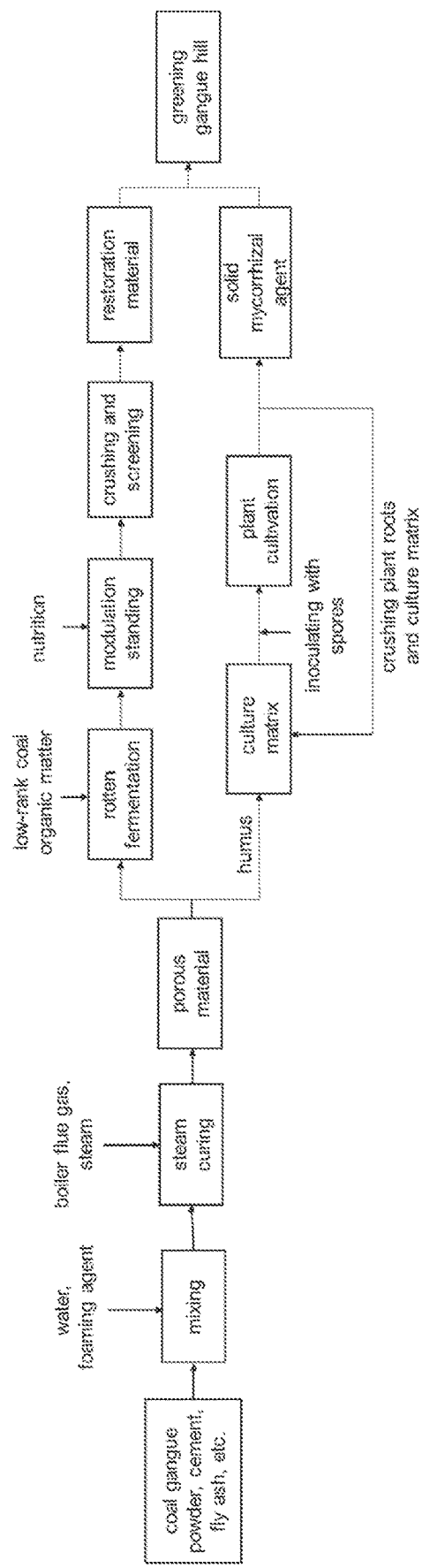

SOLID WASTE-BASED POROUS MATERIALS, METHODS FOR PREPARING THE SAME, AND METHODS OF ECOLOGICAL RESTORATION OF COAL GANGUE HILLS BY APPLYING THE SAME

CROSS-REFERENCE TO RELATED APPLICATIONS

The application is a Continuation of International Application No. PCT/CN2021/134677, filed on Dec. 1, 2021, which claims priority to Chinese Patent Application No. 202110119396.1 filed on Jan. 28, 2021, the entire contents of each of which are hereby incorporated by reference.

TECHNICAL FIELD

The present disclosure relates to the field of ecological restoration of coal gangue hills, in particular, to solid waste-based porous materials, methods for preparing the solid waste-based porous materials, and methods of ecological restoration of coal gangue hills by applying the solid waste-based porous materials.

BACKGROUND

Due to the rapid development of mining industry, a large number of tailings and waste residue have been produced. These waste residues are generally treated by storage of tailings pond, which not only occupies a large amount of land, but also pollutes soil, groundwater, and surface water due to acidification, rainfall leaching, and other effects. In the prior art, the ecological restoration technology of coal gangue hills mainly adopts a combination of soil matrix construction technology and vegetation planting technology. Soil matrix construction technology refers to a formation of a soil matrix easy for plant growth on the soil surface of coal gangue hill through covering the surface of coal gangue hill with soil.

Patent CN 110402635 A discloses an efficient method of ecological restoration of a coal gangue hill. The method includes preparing a cultivation layer substrate using coal gangue residue, fly ash, Chinese herbal medicine residue, edible fungus residue, and loam; arranging the coal gangue hill into a gentle slope, digging a planting pit every 3-5 m according to the terrain, laying the cultivation layer substrate on the surface of coal gangue hill with a thickness of 4-6 cm, and filling the planting pit; planting *Sedum lineare* Thunb on the cultivation layer substrate, and planting large-scale local plant seedlings in the planting pit; taking fern spores for sowing after the *Sedum lineare* Thunb basically covers the surface of the coal gangue hill; and completing the ecological restoration of coal gangue hill after the survival of ferns and local plants. However, in practice, it is difficult for fungi to continue to grow, and the whole substrate is difficult to actively form a good ecosystem, which is not conducive to plant growth.

SUMMARY

In order to overcome the shortcomings in the prior art, the present disclosure provides solid waste-based porous materials, methods for preparing the solid waste-based porous materials, and methods of ecological restoration of coal gangue hills by applying the solid waste-based porous materials.

In order to solve the above technical problem, the technical solution used in the present disclosure is provided.

One aspect of some embodiments of the present disclosure provides a solid waste-based porous material. The solid waste-based porous material may be composed of following raw materials with mass ratios: 40-80% of coal gangue powder, 0-40% of fly ash, 5-20% of cement, 0-10% of desulfuration gypsum, 0.7-3‰ of a foaming agent, and water, and a liquid-solid ratio may be in a range from 0.6 to 0.8.

In some embodiments, the foaming agent may be one of aluminum powder, hydrogen peroxide, or sodium perborate.

One aspect of some embodiments of the present disclosure provides a method for preparing a waste-based porous material. The method may include adding 40-80% of coal gangue powder, 0-40% of fly ash, 5-20% of cement, 0-10% of desulfurization gypsum, and 0-5% of lime into a granulator or a screening granulator, preparing a solution by adding 0.7-3‰ of a foaming agent into water, preparing particles with 1-8 mm of particle size in the granulator or screening granulator by spraying the solution several times into the granulator or screening granulator based on a liquid-solid ratio in a range from 0.6 to 0.8, and obtaining the solid waste-based porous material after flue gas curing. The boiler flue gas may include acid gas such as carbon dioxide, sulfur dioxide, nitrogen dioxide, etc., which may be used to cure and neutralize the alkaline substance in the material, so that pH of the obtained porous material is lowered to neutral.

In some embodiments, a temperature of the granulator or screening granulator may be in a range from 30° C. to 50° C., and the flue gas curing may include entering boiler flue gas and steam with a temperature above 200° C. into a curing device, a curing temperature of the boiler flue gas and steam being in a range from 160° C. to 200° C., and a curing time being in a range from 2 h to 6 h.

Another aspect of some embodiments of the present disclosure provides a method of ecological restoration of a coal gangue hill by applying a solid waste-based porous material. The method may include the following steps:

S1. preparing a coal-based solid waste restoration material including:

mixing the solid waste-based porous material, low-rank coal, and waste organic matter in a mass ratio of (3-6):(2-4):(2-6), while adding 0.1-0.3% of a microbial quickly decomposition agent for aerobic fermentation for 10-30 days, standing in a sedimentation tank for 7 days, and obtaining the coal-based solid waste restoration material with 1-8 mm of particle size after crushing and screening;

S2. preparing a solid mycorrhizal agent including:

adding a coal-based solid waste porous material with 2-5 mm of particle size into humus to obtain culture matrix, sprinkling host plant seeds inoculated with mycorrhizal spores into the culture matrix with a thickness of 10-20 cm, adding a nutrient solution, a formula of which is 945 mg/L of calcium nitrate, 607 mg/L of potassium nitrate, 115 mg/L of ammonium phosphate, 493 mg/L of magnesium sulfate, 2.5 ml/L of iron salt solution, and 5 ml/L of trace elements, pH=6.0, culturing for 1-6 months while maintaining 30-50% of humidity and 20-35° C. of temperature such that active spores and hyphae of mycorrhizal are all over the culture matrix, crushing plant roots and the culture matrix together to a size of the plant roots and the culture matrix being less than 0.6 cm to obtain original solid mycorrhizal agent, applying the original solid mycorrhizal agent to a new culture matrix at a ratio of 10-15%, and cycling step S2 to obtain an expanded solid mycorrhizal agent; and S3. greening a leveled coal gangue hill and a slope of the coal gangue hill including:

the greening the leveled coal gangue hill including:

digging pits in the leveled coal gangue hill covered with soil, evenly sprinkling the coal-based solid waste remediation material obtained by step S1 and the solid mycorrhizal agent obtained by step S2 into each pit, planting and straightening seedlings in the pit, filling soil until a surface of the pit is level with the ground, and pouring enough water in time;

the greening a slope of the coal gangue hill including:

preparing a slurry seeding material by mixing loess, the coal-based solid waste remediation material, the solid mycorrhizal agent, seeds, and water, and evenly spraying the slurry seeding material on the slope of the coal gangue hill.

In some embodiments, a mass ratio of the coal-based solid waste restoration material and the solid mycorrhizal agent obtained by step S2 may be (200-500):(2-10) in the greening the leveled coal gangue hill of step S3, and in the greening the slope of the coal gangue hill, a dosage ratio of the loess, the coal-based solid waste remediation materials, the solid mycorrhizal agent, and the seeds per hectare of the slope may be (40t-60t):(10t-20t):(1 kg-10 kg):(2 kg-10 kg), and a liquid-solid ratio may be in a range from 0.8 to 1.2.

In some embodiments, the low-rank coal may be at least one of weathered coal, lignite, or coal slime.

In some embodiments, the waste organic matter may include farm manure or sludge.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary process of restoring the ground after mining coal according to some embodiments of the present disclosure.

DETAILED DESCRIPTION

The technical solutions in the embodiments of the present disclosure are clear and completely described below. Obviously, embodiments described below are merely some embodiments of the present disclosure, not all of the embodiments. Those skilled in the art, without further creative efforts, obtain other embodiments based on the embodiments in the present disclosure, which belongs to the protection scope of the present disclosure.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, behaviors, stated features, steps, elements, and/or operations, but do not exclude the presence or addition of one or more other integers, behaviors, features, steps, elements, operations, and/or groups thereof.

FIG. 1 is a schematic diagram illustrating an exemplary process of restoring the ground after mining coal according to some embodiments of the present disclosure. In some embodiments, the process may include following steps.

step a) obtaining particles by mixing solid waste and a foaming agent in a granulator and obtaining a porous material by flue gas curing the obtained particles. In some embodiments, the solid waste may include coal gangue, which may be in powder form. In some embodiments, the solid waste may include coal gangue powder, fly ash, cement, desulfurization gypsum, and/or lime. In some embodiments, the foaming agent may be one of aluminum powder, hydrogen peroxide, or sodium perborate. The solid waste and the foaming agent may be used for preparing the porous material. The foaming agent may be used to pore the solid waste to provide safe and convenient growth space for hyphae of mycorrhizal and promote plant rooting and nutrient infiltration. In some embodiments, the porous material may be a solid waste-based porous material.

In some embodiments, raw materials with mass ratios for preparing the porous material may include 40-80% of coal gangue powder, 0-40% of fly ash, 5-20% of cement, 0-10% of desulfurization gypsum, 0-5% of lime, 0.7-3% of a foaming agent, and/or water, wherein a liquid-solid ratio may be in a range from 0.6 to 0.8 and the liquid-solid ratio herein may refer to a mass ratio between water and solid material (such as the coal gangue powder, the fly ash, the cement, the desulfurization gypsum, the lime, and the foaming agent) of the raw materials used for preparing the porous material. In some embodiments, lime may be omitted in the raw materials with mass ratios for preparing the porous material, and the liquid-solid ratio in this case may be in a range from 0.15 to 0.25. In some embodiments, the solid waste may be added into a granulator based on the above mass ratios, a solution may be prepared by adding the foaming agent to the water, and the solid waste may be processed into particles in the granulator by spraying the solution several times into the granulator based on the liquid-solid ratio. In some embodiments, the raw materials may be added into a mixer, and then poured into a mold for foaming to obtain particles, and in this case, the granulator may be omitted. A particle size of the particles may be in a range from 1 mm to 8 mm. In some embodiments, a particle size of the particle may be in a range from 2 mm to 7 mm. In some embodiments, a particle size of the particle may be in a range from 2 mm to 5 mm. In some embodiments, a particle size of the particle may be in a range from 2 mm to 4 mm. The granulator may include a pelletizer or a screening granulator. In the process of preparing the particles, a temperature of the granulator may be in a range from 30 to 50° C.

In some embodiments, the porous material may be obtained after flue gas curing of the particles. A process of flue gas curing may include placing the particles in a curing device and making boiler flue gas and steam with a temperature above 200° C. enter into the curing device. In some embodiments, a curing temperature of the boiler flue gas and steam may be in a range from 160° C. to 200° C. and curing time may be in a range from 2 h to 6 h. The boiler flue gas may include acid gases such as carbon dioxide, sulfur dioxide, nitrogen dioxide, etc., which may be used to neutralize alkaline substances in the raw materials to reduce pH value of the porous material to neutral, so as to realize curing of porous materials. The cured porous material can be easier to restore the ground, for example, greening a flat land and a slope of a coal gangue hill.

Step b) obtaining a restoration material by treating the porous material with other materials. In some embodiments, the other materials may include organic matter, a microbial quickly decomposition agent, etc. In some embodiments, the other materials may include low-rank coal, organic matter, a microbial quickly decomposition agent, etc. In some embodiments, the other materials may include low-rank coal, fowl manure, organic matter, a microbial quickly decomposition agent, etc.

In some embodiments, a process of obtaining the restoration material may include mixing the porous material, the low-rank coal, and the organic matter, and adding the microbial quickly decomposition agent. The porous materials, the low-rank coal, and the organic matter (e.g., fowl manure) may be mixed in a mass ratio of (3-6):(2-4):(2-6). In some embodiments, the low-rank coal may include one or more of weathered coal, lignite, and coal slime, the organic matter may include farmyard fertilizer, sludge, fowl manure, etc., and a concentration of the microbial quickly decomposition agent in the mixing process may be in a range from 0.1% to 0.3%. After mixing the porous materials with the other materials and adding the microbial quickly decomposition agent, the obtained mixture is aerobic fermented for 10-30 days, and then stood in a sedimentation tank for 7 days, and the restoration material with 1-8 mm of particle size may be finally obtained after crushing and screening. The microbial quickly decomposition agent refers to a microbial agent that can make the soil easier for plants to grow. The microbial quickly decomposition agent may produce a large amount of cellulase, which can quickly decompose the solid waste and the other materials (such as low-rank coal) and other substance in the soil into nutrients (such as organic matter and humus) directly used by plants, thereby improving soil structure, retaining water and fertilizer, and killing harmful bacteria and insect eggs in plants, which is conducive to growth of plants and restoration of ground.

Step c) sprinkling plant seeds inoculated with mycorrhizal fungi spores into a culture matrix for culture to obtain a mycorrhizal fungi agent (also referred to as mycorrhizal agent). In some embodiments, the culture matrix is made of the porous material and humus.

In some embodiments, a process of obtaining the mycorrhizal agent may include adding the porous material to the humus to obtain the culture matrix with a thickness in a range from 10 cm to 20 cm. A particle size of the porous material may be in a range from 2 mm to 5 mm. The process also includes sprinkling plant seeds inoculated with mycorrhizal spores into the culture matrix and adding a nutrient solution, such as Hoagland Solution™, and culturing for 1-6 months while maintaining 30-50% of humidity and 20-35° C. of temperature such that active spores and hyphae of mycorrhizal fungi are spread all over the culture matrix. A formula of the nutrient solution is 945 mg/L of calcium nitrate, 607 mg/L of potassium nitrate, 115 mg/L of ammonium phosphate, 493 mg/L of magnesium sulfate, 2.5 ml/L of iron salt solution, 5 ml/L of trace elements, and pH=6.0. The process also includes crushing plant roots and the culture matrix together to make a size of the plant roots and the culture matrix less than 0.6 cm, thereby obtaining an original solid mycorrhizal agent after the active spores and hyphae of mycorrhizal are spread all over the culture matrix. The process further includes applying the original solid mycorrhizal agent to a new culture matrix at a ratio of 10-15% and cycling the above step to obtain an expanded solid mycorrhizal agent (i.e., a finally solid mycorrhizal agent).

Step d) restoring the ground using the restoration material and the solid mycorrhizal agent obtained by steps a)-c). In some embodiments, the ground may include terrain such as a flat land, a slope, etc.

In some embodiments, a process of restoring the ground may include for the flat land, digging pits on the flat land, sprinkling the restoration material and the solid mycorrhizal agent, and planting seedlings. In some embodiments, a mass ratio of the restoration material and the solid mycorrhizal agent may be (200-500):(2-10). The process also includes for slope land, preparing a slurry seeding material by mixing loess, restoration material, solid mycorrhizal agent, plant seeds, and water, and spraying evenly the slurry seeding material on the slope for restoration. In some embodiments, a dosage ratio of the loess, the restoration materials, the solid mycorrhizal agent, and plant seeds may be (40 t-60 t):(10 t-20 t):(1 kg-10 kg):(2 kg-10 kg), and a liquid-solid ratio may be in a range from 0.8 to 1.2.

In some embodiments, restoration of the ground after mining may be realized using the restoration material prepared based on the porous material and the mycorrhizal agent. The porous material is mainly made of solid waste of coal, which not only saves restoration material, but also avoids pollution to environment and destruction of land resources caused by accumulation of solid waste.

Some embodiments of the present disclosure provide a method for preparing a porous material based on solid waste. In some embodiments, the method for preparing the porous material may include obtaining particles by mixing the solid waste and a foaming agent in a granulator and obtaining the porous material after flue gas curing the obtained particles. In some embodiments, the method for preparing the porous material may include obtaining particles by pouring the solid waste and a foaming agent into a mold for foaming and boiler flue gas curing. The solid waste may include coal gangue powder, fly ash, cement, desulfurization gypsum, lime, etc. The solid waste may include coal gangue powder, fly ash, cement, desulfurization gypsum, etc.

In some embodiments, raw materials with mass ratios for preparing porous material may include 40-80% of coal gangue powder, 0-40% of fly ash, 5-20% of cement, 0-10% of desulfurization gypsum, 0-5% of lime, 0.7-3‰ of a foaming agent, and water, and a liquid-solid ratio may be in a range from 0.6 to 0.8. More description of the preparation of the porous material can be found elsewhere in the present disclosure. In some embodiments, raw materials with mass ratios for preparing porous material may include 40-80% of coal gangue powder, 0-40% of fly ash, 5-20% of cement, 0-10% of desulfurization gypsum, 0.7-3‰ of a foaming agent, and water, and a liquid-solid ratio may be in a range from 0.15 to 0.25.

Some embodiments of the present disclosure provide a flue gas curing method. The flue gas curing method may include placing particles to be cured in a curing device and making boiler flue gas and steam with a temperature above 200° C. enter into the curing device. In some embodiments, a curing temperature of the boiler flue gas and the steam may be in a range from 160° C. to 200° C. and a curing time may be in a range from 2 h to 6 h. More description of the flue gas curing method can be found elsewhere in the present disclosure.

Some embodiments of the present disclosure provide a porous material. The porous material may be used to prepare a restoration material for restoring the ground after mining and culture matrix for culturing mycorrhizal fungi. In some embodiments, the porous material may include a solid waste-based porous material. The solid waste-based porous material may refer to a porous material obtained by processing the solid waste. The solid waste as raw materials may include coal gangue, which have a wide range of sources and low cost. Moreover, the solid waste is used as one of raw materials to produce the porous material for restoring the ground after mining, which can consume a large amount of the solid waste and realize green environmental protection. In some embodiments, the raw materials (in mass ratios) of the porous material (e.g., the solid waste-based porous material) may include 40-80% of coal gangue powder, 0-40% of fly ash, 5-20% of cement, 0-10% of desulfurization gypsum, 0-5% of lime, 0.7‰-3‰ of a foaming agent, and water, wherein a liquid-solid ratio may be in a range from 0.6 to 0.8. In some embodiments, the foaming agent may be one of aluminum powder, hydrogen peroxide, or sodium perborate. In some embodiments, the raw materials (in mass ratios) of the porous material (e.g., the solid waste-based porous material) may include 40-80% of coal gangue powder, 0-40% of fly ash, 5-20% of cement, 0-10% of desulfurization gypsum, 0.7‰-3‰ of a foaming agent, and water, wherein a liquid-solid ratio may be in a range from 0.15 to 0.25.

Some embodiments of the present disclosure provide a method for preparing a porous material. The method may include obtaining particles by mixing solid waste and a foaming agent in a granulator (e.g., a granulator or a screening granulator) and obtaining porous materials after flue gas curing the obtained particles. The solid waste may include coal gangue powder, fly ash, cement, desulfurization gypsum, and lime. In some embodiments, raw materials (in mass ratios) for preparing porous materials may include 40-80% of coal gangue powder, 0-40% of fly ash, 5-20% of cement, 0-10% of desulfurization gypsum, 0-5% of lime, 0.7-3‰ of a foaming agent, and water, and a liquid-solid ratio may be in a range from 0.6 to 0.8. Boiler flue gas may include acid gases such as carbon dioxide, sulfur dioxide, nitrogen dioxide, etc., which may be used for curing and neutralizing alkaline substances in the raw material to reduce pH value of the porous material to neutral. A temperature of the granulator or the screening granulator may be in a range from 30° C. to 50° C. In some embodiments, the flue gas curing method may include placing particles to be cured into a curing device, making the boiler flue gas and steam with a temperature above 200° C. enter into the curing device, a curing temperature of the boiler flue gas and the steam may be in a range from 160° C. to 200° C. and a curing time may be in a range from 2 h to 6 h. In some embodiments, the desulfurization gypsum may be omitted in the method of preparing a waste-based porous material. In some embodiments, the lime may be omitted in the method of preparing a waste-based porous material. In some embodiments, the granulator may be omitted. In some embodiments, the waste-based porous material may be prepared by Example 1. In some embodiments, the waste-based porous material may be prepared by Example 2.

Some embodiments of the present disclosure provide a method of ecological restoration of a coal gangue hill by applying a solid waste-based porous material. The method may include the following steps.

S1. preparing a coal-based solid waste restoration material including: mixing the solid waste-based porous material, low-rank coal, and waste organic matter in a mass ratio of (3-6):(2-4):(2-6), while adding 0.1-0.3% of a microbial quickly decomposition agent for aerobic fermentation for 10-30 days, standing in a sedimentation tank for 7 days, and obtaining the coal-based solid waste restoration material with 1-8 mm of particle size after crushing and screening. In some embodiments, the low-rank coal may be at least one of weathered coal, lignite, or coal slime, and the waste organic matter may include farm manure or sludge.

In some embodiments, coal-based solid waste may be used as main raw material to prepare a series of related materials. This method can improve soil structure, and the coal-based solid waste can be used as a nutrient carrier to increase soil organic matter. At the same time, the coal-based solid waste has a strong role in water and fertilizer conservation, which can provide sufficient water and nutrients for plant growth, save the addition of soil and fertilizer, and effectively reduce treatment cost. A use of the coal-based solid waste in the ecological treatment of coal gangue hills not only saves natural restoration materials, but also avoids pollution to environment and damage to land resources caused by the accumulation of solid waste.

S2. preparing a solid mycorrhizal agent including: adding the porous material with 2-5 mm of particle size into humus to obtain culture matrix, sprinkling host plant seeds inoculated with mycorrhizal fungi spores into the culture matrix with a thickness of 10-20 cm, adding a nutrient solution, culturing for 1-6 months while maintaining 30-50% of humidity and 20-35° C. of temperature such that active spores and hyphae of mycorrhizal are spread all over the culture matrix, crushing plant roots and the culture matrix together to a size of the plant roots and the culture matrix being less than 0.6 cm to obtain original solid mycorrhizal agent, applying the original solid mycorrhizal agent to new culture matrix at a ratio of 10-15%, and cycling step S2 to obtain an expanded solid mycorrhizal agent. In some embodiments, a formula of the nutrient solution is 945 mg/L of calcium nitrate, 607 mg/L of potassium nitrate, 115 mg/L of ammonium phosphate, 493 mg/L of magnesium sulfate, 2.5 ml/L of iron salt solution, 5 ml/L of trace elements, and pH=6.0.

The solid mycorrhizal fungi in the solid mycorrhizal agent prepared by the method of the present disclosure can be loaded on the porous material, so as to maintain the activity for a long time, which is easier to store than the liquid mycorrhizal fungi. The porous material can provide safe and suitable growth space for hyphae of mycorrhizal fungi in the growth process of mycorrhizal fungi. On the other hand, substances secreted by the mycorrhizal fungi can affect properties of the porous material and strengthen interaction between the porous material and soil particles, so as to have potential to promote a formation of soil aggregates which have the porous material as a core. A structure-activity relationship between the porous carrier material and mycorrhizal activity can promote mycorrhizal growth and plant rooting to realize ecological restoration in ecologically fragile areas of coal base.

S3. greening a leveled coal gangue hill and a slope of the coal gangue hill including the following steps.

The greening the leveled coal gangue hill includes: digging pits in the leveled coal gangue hill covered with soil, evenly sprinkling the coal-based solid waste restoration material obtained by step S1 and the solid mycorrhizal agent obtained by step S2 into each pit, planting and straightening seedlings in the pit, filling soil until a surface of the pit is leveled with the ground, and pouring enough water in time. In some embodiments, a mass ratio of the restoration material obtained by step S1 and the solid mycorrhizal agent obtained by step S2 may be (200-500):(2-10) in the greening the leveled coal gangue hill. In some embodiments, the plant seedlings may include *Pinus tabulaeformis, juniper*, Chinese fir, and *Robinia pseudoacacia*.

The greening a slope of the coal gangue hill includes: preparing a slurry seeding material by mixing loess, the coal-based solid waste restoration material, the solid mycorrhizal agent, seeds, and water, and evenly spraying the slurry seeding material on the slope of the coal gangue hill. In some embodiments, in the greening the slope of the coal gangue hill, a dosage ratio of the loess, the restoration material, the solid mycorrhizal agent, and the seeds per hectare of the slope may be (40t-60t):(10t-20t):(1 kg-10 kg):(2 kg-10 kg), and a liquid-solid ratio may be in a range from 0.8 to 1.2. In some embodiments, the sprayed seeds may include alfalfa, *astragalus adsurgens*, persian *chrysanthemum*, february flower, *elymus*, dogtail grass, and *Amorpha fruticosa*.

In some embodiments, a structure-activity relationship between porous carrier material and mycorrhizal activity can promote mycorrhizal fungi growth and plant rooting to realize ecological restoration in ecologically fragile areas of coal base.

Example 1 Solid Waste-Based Porous Materials

60% of coal gangue powder, 20% of fly ash, 5% of cement, 2.5% of desulfurization gypsum, 12.5% of lime, 0.7‰ of a foaming agent were added into a mixer in a liquid-solid ratio of 0.65 and were mixed evenly to obtain a mixture, the mixture was poured into a mold for foaming at 50° C. for 6 h and boiler flue gas curing with a temperature of 160° C. for 4 h, and particles with 1-8 mm of particle size were obtained through crushing and screening after drying.

Example 2 Solid Waste-Based Porous Materials

50% of coal gangue, 30% of fly ash, 15% of cement, and 5% of desulfurization gypsum were added into a granulator, a solution was prepared by adding 1.5‰ of a foaming agent into water, particles with 1-8 mm of particle size were prepared in the granulator by spraying the solution several times into the granulator based on a liquid-solid ration of 0.18, the obtained particles were foamed at 50° C. for 6 h and cured at 160° C. for 6 h, and porous material without sintering was obtained.

Example 3 Coal-Based Solid Waste Restoration Materials

The solid waste-based porous material obtained by Example 1, low-rank coal, and waste organic matter were mixed in a mass ratio of 4:3:3, while 0.15% of a microbial quickly decomposition agent was added for aerobic fermentation for 10-30 days and standing in a sedimentation tank for 7 days, and the coal-based solid waste restoration material with 1-8 mm of particle size was obtained after crushing and screening.

Example 4 Solid Mycorrhizal Agents

Culture matrix was obtained by adding a small amount of humus and a nutrient solution whose formula is 945 mg/L of calcium nitrate, 607 mg/L of potassium nitrate, 115 mg/L of ammonium phosphate, 493 mg/L of magnesium sulfate, 2.5 ml/L of iron salt solution, 5 ml/L of trace elements, and pH=6.0 into the solid waste-based porous material obtained by Example 2, lettuce inoculated with mycorrhizal spores was planted into the culture matrix, active spores and hyphae of mycorrhizal were all over the culture matrix after culturing for 2 months, and the lettuce roots and the culture matrix were crushed together to obtain the solid mycorrhizal agent after the lettuce was harvested.

Example 5 Planting Administration

The leveled coal gangue hill covered with soil also needs reclamation and greening. *Pinus tabulaeformis* were planted on a berm platform, pits were dug, 300 g coal-based solid waste restoration material and 3 g solid mycorrhizal agent were sprinkled into each pit, *Pinus tabulaeformis* seedlings were planted and straightened in the pit, soil was filled until a surface of the pit is level with the ground, and enough water was poured in time. Then, water was poured regularly. After 4 months, compared with *Pinus tabulaeformis* in a control area with conventional quick acting fertilizer, a survival rate of *Pinus tabulaeformis* in the Example 5 was increased by 20%, which is determined by an equation of (95.9%-80%)/80%.

| Test area | Number of planted trees | Number of withered trees | Number of surviving trees | Survival rate (%) |
|---|---|---|---|---|
| Control group | 80 | 16 | 64 | 80.0 |
| Example 5 | 73 | 3 | 70 | 95.9 |

Example 6 Spraying Administration

A spraying method is adopted on the slope of the coal gangue hill. Spraying material, including the coal-based solid waste restoration material obtained by Example 3, the solid mycorrhizal agent obtained by Example 4, loess, and plant seeds, were mixed at the ratio of 50 tons:20 tons:5 kg:2 kg per hectare, and a uniform slurry was prepared by adding water into the mixed spraying material at the liquid-solid ratio of 1:1, and the uniform slurry was sprayed with a spraying truck. The plant seeds were mixed seeds of alfalfa, *Astragalus adsurgens*, persian *chrysanthemum*, february flower, *elymus, Amorpha fruticosa*, etc. As shown in Table 2 of the comparison data with the control group with conventional quick acting fertilizer, it can be seen that the plant growth of example 6 lags behind the control group at the initial stage, but the growth trend catches up with and surpasses in the later stage, indicating that the spraying material of the present disclosure has the effect of slow-release and long-term effect.

After 150 days of spraying sowing, three 1 m² quadrats were taken in each test area, the above-ground parts of all plants were harvested in the quadrats and dry weight of the above-ground parts was measured, and average values of each test area were determined. The results showed that dry weight of the plants in the control group was 373.2 g, and dry weight of the plants of the quadrat in Example 6 was 724.0 g, which was nearly twice as many as that of the former.

TABLE 2

| | Comparison of plant growth in a spraying test area (unit:cm) | | | | | | | |
|---|---|---|---|---|---|---|---|---|
| | 21 days of spraying sowing | | 45 days of spraying sowing | | 72 days of spraying sowing | | 150 days of spraying sowing | |
| Test area | Plant height | Root length | Plant height | Root length | Plant height | Root length | Plant height | Root length |
| Control group | 67 | 23 | 116 | 51 | 203 | 86 | 610 | 145 |

TABLE 2-continued

Comparison of plant growth in a spraying test area (unit:cm)

| Test area | 21 days of spraying sowing | | 45 days of spraying sowing | | 72 days of spraying sowing | | 150 days of spraying sowing | |
|---|---|---|---|---|---|---|---|---|
| | Plant height | Root length | Plant height | Root length | Plant height | Root length | Plant height | Root length |
| Example 6 | 65 | 22 | 145 | 46 | 185 | 78 | 690 | 192 |

Only the preferred embodiments of the present disclosure are described in detail above, but the present disclosure is not limited to the above embodiments. Within the scope of knowledge possessed by ordinary technicians in the art, various changes or modifications can also be made without departing from the purpose of the present disclosure, and all changes or modifications should be included in the protection scope of the present disclosure.

What is claimed is:

1. A method of ecological restoration of a coal gangue hill by applying a solid waste-based porous material, comprising:
    S1. preparing a coal-based solid waste restoration material including:
    mixing the solid waste-based porous material, low-rank coal, and waste organic matter in a mass ratio of (3-6):(2-4):(2-6), while adding 0.1-0.3% of a microbial quick corrosion agent for aerobic fermentation for 10-30 days, wherein the solid waste-based porous material is obtained by:
        adding 40-80% of coal gangue powder, 0-40% of fly ash, 5-20% of cement, 0-10% of desulfurization gypsum, and 0-5% of lime into a granulator or a screening granulator;
        preparing a solution by adding 0.7-3% of a foaming agent into water;
        preparing particles with 1-8 mm of particle size in the granulator or screening granulator by spraying the solution several times into the granulator or screening granulator based on a liquid-solid ratio in a range from 0.6 to 0.8; and
        obtaining the solid waste-based porous material after flue gas curing;
    standing in a sedimentation tank for 7 days, and
    obtaining the coal-based solid waste restoration material with 1-8 mm of particle size after crushing and screening,
    S2. preparing a solid mycorrhizal agent including:
    adding a coal-based solid waste porous material with 2-5 mm of particle size into humus to obtain culture matrix, sprinkling host plant seeds inoculated with mycorrhizal spores into the culture matrix with a thickness of 10-20 cm, adding a nutrient solution, a formula of which is 945 mg/L of calcium nitrate, 607 mg/L of potassium nitrate, 115 mg/L of ammonium phosphate, 493 mg/L of magnesium sulfate, 2.5 ml/L of iron salt solution, and 5 ml/L of trace elements, pH=6.0, culturing for 1-6 months while maintaining 30-50% of humidity and 20-35° C. of temperature such that active spores and hyphae of mycorrhizal are all over the culture matrix,
    crushing plant roots and the culture matrix together to a size of the plant roots and the culture matrix being less than 0.6 cm to obtain mycorrhizal solid original agent,
    applying the mycorrhizal solid original agent to new culture matrix at a ratio of 10-15%, and
    cycling step S2 to obtain an expanded solid mycorrhizal agent; and
    S3. greening a leveled coal gangue hill and a slope of the coal gangue hill including:
        the greening the leveled coal gangue hill including:
            digging pits in the leveled coal gangue hill covered with soil,
            evenly sprinkling the coal-based solid waste restoration material obtained by step S1 and the solid mycorrhizal agent into each pit obtained by step S2,
            planting and straightening seedlings in the pit, filling soil until a surface of the pit is level with the ground, and
            pouring enough water in time;
        the greening a slope of the coal gangue hill including:
            preparing a slurry seeding material by mixing loess, the coal-based solid waste restoration material, the solid mycorrhizal agent, seeds, and water, and
            evenly spraying the slurry seeding material on the slope of the coal gangue hill.

2. The method of claim 1, wherein
a mass ratio of the coal-based solid waste restoration material and the solid mycorrhizal agent obtained by step S2 is (200-500):(2-10) in the greening the leveled coal gangue hill of step S3; and
in the greening the slope of the coal gangue hill, a dosage ratio of the loess, the coal-based solid waste restoration materials, the solid mycorrhizal agent, and the seeds per hectare of the slope is (40t-60t):(10t-20t):(1 kg-10 kg):(2 kg-10 kg), wherein a liquid-solid ratio is in a range from 0.8 to 1.2.

3. The method of claim 1, wherein the low-rank coal is at least one of weathered coal, lignite, or coal slime.

4. The method of claim 1, wherein the waste organic matter includes farm manure or sludge.

* * * * *